(12) United States Patent
Gupta et al.

(10) Patent No.: US 11,409,991 B2
(45) Date of Patent: Aug. 9, 2022

(54) REGULARIZING THE TRAINING OF CONVOLUTIONAL NEURAL NETWORKS

(71) Applicant: Google LLC, Mountain View, CA (US)

(72) Inventors: Vineet Gupta, Palo Alto, CA (US);
Philip M. Long, Palo Alto, CA (US);
Hanie Sedghi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 696 days.

(21) Appl. No.: 16/422,797

(22) Filed: May 24, 2019

(65) Prior Publication Data

US 2020/0372300 A1 Nov. 26, 2020

(51) Int. Cl.
| | | |
|---|---|---|
| *G06K 9/62* | (2022.01) | |
| *G06N 3/08* | (2006.01) | |
| *G06F 17/16* | (2006.01) | |
| *G06F 17/14* | (2006.01) | |

(52) U.S. Cl.
CPC .......... *G06K 9/6257* (2013.01); *G06F 17/142* (2013.01); *G06F 17/16* (2013.01); *G06K 9/6235* (2013.01); *G06N 3/08* (2013.01); *G06K 2009/6237* (2013.01)

(58) Field of Classification Search
CPC ............... G06K 9/6257; G06K 9/6235; G06K 2009/6237; G06F 17/142; G06F 17/16; G06N 3/08
See application file for complete search history.

(56) References Cited

U.S. PATENT DOCUMENTS

| | | | |
|---|---|---|---|
| 11,126,660 B1* | 9/2021 | Sen ...................... | G06N 3/0445 |
| 2019/0236817 A1* | 8/2019 | Cheng ................ | G01R 33/5611 |
| 2022/0094443 A1* | 3/2022 | Bunandar .............. | H04B 10/70 |

OTHER PUBLICATIONS

Sedghi, Hanie, Vineet Gupta, and Philip M. Long. "The singular values of convolutional layers." arXiv preprint arXiv:1805.10408 (2018). (Year: 2018).*
Chao, "A note on block circulant matrices," Kyungpook Mathematical Journal, 14:97-100, 1974, 4 pages.
Goodfellow et al., "Deep Learning" MIT Press, 2016, 802 pages.
Gouk et al., "MaxGain: Regularization of neural networks by constraining activation magnitudes," arXiv:1804.05965, 2018, 16 pages.
Gouk et al., "Regularization of neural networks by enforcing lipschnitz continuity," arXiv: 1804.04368, 2018, 30 pages.
Gray, "Toeplitz and circulant matrices: A review" Foundation and Trends® in Communications and Information Theory, 2(3):155-239, 2006, 21 pages.

(Continued)

*Primary Examiner* — Fayyaz Alam
(74) *Attorney, Agent, or Firm* — Fish & Richardson P.C.

(57) ABSTRACT

Methods, systems, and apparatus, including computer programs encoded on computer storage media, for training a convolutional neural network using a regularization scheme. One of the methods includes repeatedly performing the following operations: obtaining a kernel of a particular convolutional layer; applying a Fourier transform to the kernel; generating a decomposition using singular-value decomposition (SVD); generating a regularized diagonal matrix; generating a recomposition; applying an inverse Fourier transform to the recomposition; and training the convolutional neural network on training inputs.

20 Claims, 3 Drawing Sheets

(56) References Cited

OTHER PUBLICATIONS

He et al., "Identity mappings in deep residual networks," European Conference on Computer Vision, pp. 630-645, 2016, 15 pages.
Hochreiter et al., "Gradient flow in recurrent nets: the difficulty of learning long-term dependencies," Technische Universitaet Muenchen, 2001, 15 pages.
Hochreiter, "Untersuchung zu dynamischen neuronalen netzen," Diploma, Technische Universitaet Muenchen, 91:1, 1991, 74 pages.
Horn et al., "Matrix Analysis," Cambridge University Press, 2012, 15 pages.
Jain, "Fundamentals of digital image processing" Englewood Cliffs, NJ: Prentice Hall, 1989, 296 pages.
LeCun et al., "Gradient-based learning applied to document recognition," Proceedings of the IEEE, 86(11):2278-2324,1998, 46 pages.
Lefkimmiatis et al., "Hessian schatten-norm regularization for linear inverse problems," IEEE Transaction on Image Processing, 22(5): 1873-1888, 2013, 15 pages.
Miyato et al., "Spectral normalization for generative adversarial networks," ICLR, 2018, 26 pages.
Neyshabur et al., "Path-SGD: Path-normalized optimization in deep neural networks," Advances in Neural Information Processing Systems, pp. 2422-2430, 2015, 12 pages.
Pennington et al., "Resurrecting the sigmoid in deep learning through dynamical isometry: theory and practice," Advances in Neural Information Processing Systems, pp. 4788-4798, 2017, 11 pages.
Saxe et al., "Exact solutions to the nonlinear dynamics of learning in deep linear neural networks," arXiv: 1312.3120, 2013, 22 pages.
Seghi et al., "The Singular Values of Convolutional Layers," 32nd Conference on Neural Information Processing Systems, 2018, 9 pages.
Yoshida et al., "Spectral norm regularization for improving the generalizability of deep learning," arXiv: 1705.10941, 2017, 12 pages.
Young, "On the multiplication of successions of fourier constants," Proc. R. Soc. Lond. A, 87(596): 331-339, 1912, 10 pages.

\* cited by examiner

REGULARIZING THE TRAINING OF CONVOLUTIONAL NEURAL NETWORKS

BACKGROUND

This specification relates to training neural networks.

Neural networks are machine learning models that employ one or more layers of transformations to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are convolutional neural networks. A convolutional neural network is a neural network that includes one or more convolutional layers. Generally, an output generated by a convolutional layer can be computed as a linear transformation of an input to the layer.

SUMMARY

This specification describes a system implemented as computer programs on one or more computers in one or more locations that trains a convolutional neural network to generate one or more outputs based on the received one or more inputs.

The subject matter described in this specification can be implemented in particular embodiments so as to realize one or more of the following advantages.

In many convolutional neural network training scenarios, at each iteration of the training process, current values of parameters of the network are updated using a determined gradient, i.e., the gradient of an objective function that measures the quality of the training outputs. Typically, the size of the determined gradient directly affects the quality of the training of the network. In some cases where the convolutional neural network is a deep convolutional neural network, i.e., having a plurality of convolutional layers, in order to complete a training iteration, the determined gradient has to be propagated back from a last convolutional layer all the way to a first convolutional layer in the convolutional neural network.

Because of this, in circumstances where the size of the determined gradient is large, then it may become even larger during the back-propagation process, causing numerical overflow or irregular oscillations in the objective function that is used to calculate the gradient. This scenario is referred to as an exploding gradient. Exploding gradients inhibit the convolutional neural network from further training. That is, existing techniques for training the network in such circumstances consume a large amount of computational resources and wall clock time due to exploding gradients inhibiting successful learning.

The described techniques, on the other hand, augment the training process by bounding the size of the gradient during the back-propagation process. In so doing, the described system is capable of maintaining an effective training process of the convolutional neural network by mitigating any impact caused by exploding gradients. In other words, the system can effectively train the network to generate high quality outputs for a particular task in a much more computationally efficient manner than other techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
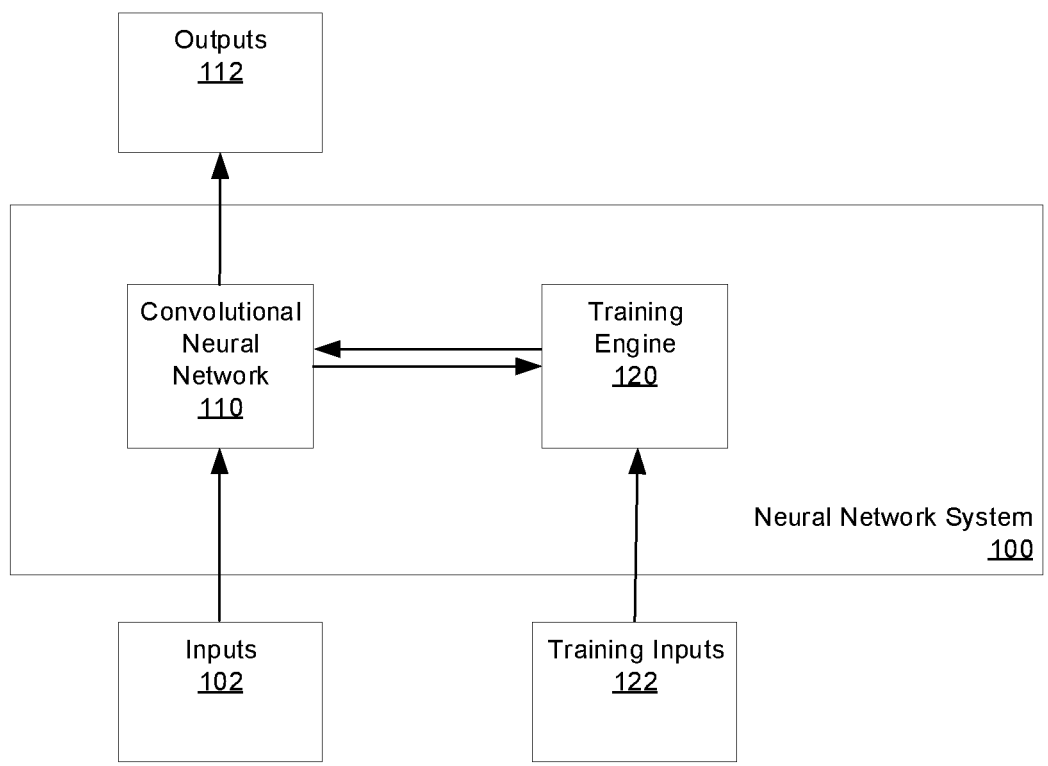
FIG. 1 shows an example neural network system.

This specification describes a system implemented as computer programs on one or more computers in one or more locations that trains a convolutional neural network to generate one or more outputs based on the received one or more inputs. In particular, the convolutional neural network can be configured to receive any kind of digital data input and to generate any kind of score, classification, or regression output based on the input.

For example, the convolutional neural network can be configured to perform an image processing task, e.g., to receive an input that is one or more images or features that have been extracted from one or more images and to process the input to generate an output for the image processing task.

For example, if the task is image classification, the outputs generated by the convolutional neural network for a given image may be scores for each of a set of object categories, with each score representing an estimated likelihood that the image contains an image of an object belonging to the category.

As another example, if the task is object detection, the outputs generated by the convolutional neural network for a given image may be one or more bounding boxes each associated with respective scores, with each bounding box representing an estimated location in the image and the respective score representing an estimated likelihood that an object is depicted at the location in the image, i.e., within the bounding box.

As another example, if the task is semantic segmentation, the outputs generated by the convolutional neural network for a given image may be labels for each of a plurality of pixels in the image, with each pixel being labeled as belonging to one of a set of object categories. Alternatively, the outputs can be, for each of the plurality of pixels, a set of scores that includes a respective score for each of the set of object categories that represents the likelihood that the pixel belongs to an object from the object category.

As another example, if the inputs to the convolutional neural network are Internet resources (e.g., web pages), documents, or portions of documents or features extracted from Internet resources, documents, or portions of documents, the outputs generated by the convolutional neural network for a given Internet resource, document, or portion of a document may be a score for each of a set of topics, with each score representing an estimated likelihood that the Internet resource, document, or document portion is about the topic.

As another example, if the inputs to the convolutional neural network are features of an impression context for a particular advertisement, the output generated by the convolutional neural network may be a score that represents an estimated likelihood that the particular advertisement will be clicked on.

As another example, if the inputs to the convolutional neural network are features of a personalized recommendation for a user, e.g., features characterizing the context for the recommendation, e.g., features characterizing previous actions taken by the user, the outputs generated by the convolutional neural network may be a score for each of a set of content items, with each score representing an estimated likelihood that the user will respond favorably to being recommended the content item.

As another example, if the input to the convolutional neural network is text in one language, the outputs generated by the convolutional neural network may be a score for each of a set of pieces of text in another language, with each score representing an estimated likelihood that the piece of text in the other language is a proper translation of the input text into the other language.

FIG. 1 shows an example neural network system 100. The neural network system 100 is an example of a system implemented as computer programs on one or more computers in one or more locations, in which the systems, components, and techniques described below are implemented.

In particular, the neural network system 100 includes a convolutional neural network 110 and a training engine 120.

The convolutional neural network 110 is referred to as a convolutional neural network because the neural network 110 includes one or more convolutional layers. A convolutional layer is a layer that has a kernel and that computes linear transformations of its inputs using the kernel. A convolutional layer receives input features from an input feature map and generates as output an output feature map. The input feature map can have three dimensions, for example, a horizontal dimension (X), a vertical dimension (Y), and a depth dimension (Z). Similarly, the output feature map can have three dimensions, for example, a horizontal dimension (X'), a vertical dimension (Y'), and a depth dimension (Z'). In both input and output feature maps, all features at a same level of depth, i.e., having the same depth dimension value, can be denoted as a channel.

To generate an output value at a given position in an output channel, the convolutional layer performs a linear transformation of the values of the features in all channels of the input feature map in a local neighborhood centered at the corresponding position in the input feature map. Crucially, the same linear transformation is used for all positions in the input feature map. The coefficients used in this linear transformation are compiled in the kernel of the convolutional layer. The kernel can have four dimensions, for example, $m_{input} \times m_{output} \times k_{width} \times k_{height}$. In particular, $m_{input}$ depends on the value of the depth dimension (Z) of the input feature map. The value of depth dimension (Z') of the output feature map depends on $m_{output}$. The values of horizontal dimension (X') and vertical dimension (Y') of the output feature map depend on the size of the local neighborhood, which is determined by $k_{width} \times k_{height}$. In addition, the values of X', Y', and Z' can further depend on certain properties of the convolutional layer, e.g., dilation factor, stride, padding, and so on.

The training engine 120 trains the convolutional neural network 110 on training inputs from a set of training inputs 122 using an iterative training process. In particular, the training engine 120 trains the convolutional neural network using the iterative training process to determine trained values of the parameters of the convolutional neural network, including the coefficients compiled in the kernels of the convolutional layers in the neural network 110.

At each iteration of the training process, the training engine 120 receives a mini-batch of training inputs from the training inputs 122 and processes the training inputs in the mini-batch using the convolutional neural network 110 in accordance with the current values of the parameters to generate a training output for each input in the mini-batch. The training engine 120 determines a gradient of an objective function that measures the quality of the training outputs, e.g., relative to ground truth or known outputs for the training inputs, with respect to the parameters of the convolutional neural network 110. At the end of each training iteration, the training engine 120 applies, e.g., through backpropagation, respective updates to the current values of the parameters of the convolutional neural network 110 using the gradient determined at the iteration.

To improve the training of the convolutional neural network 110, the training engine 120 augments the training by employing a regularization scheme. In particular, prior to at least some of the training iterations, the training engine 120 can determine if criteria are satisfied for regularizing the kernel of any one of the convolutional layers. If the criteria for regularizing the kernel of a particular convolutional layer are satisfied, the training engine 120 can regularize the kernel prior to performing the training iteration. That is, the training engine 120 regularizes the current values of the kernel to generate a regularized kernel and then updates the regularized kernel by performing the training iteration. Regularizing a kernel will be described in more detail below with reference to FIGS. 2 and 3.

Once the convolutional neural network 110 has been trained with training inputs 122, the system 100 can provide data specifying the trained convolutional neural network, e.g., the trained values of the parameters of the neural network and data specifying the architecture of the neural network to another system, e.g., a second neural network system, for use in processing new inputs. Instead of or in addition to providing the data specifying the trained network, the system 100 can use the trained convolutional neural network to process new inputs 102 and generate respective outputs 112.

Figure 2:
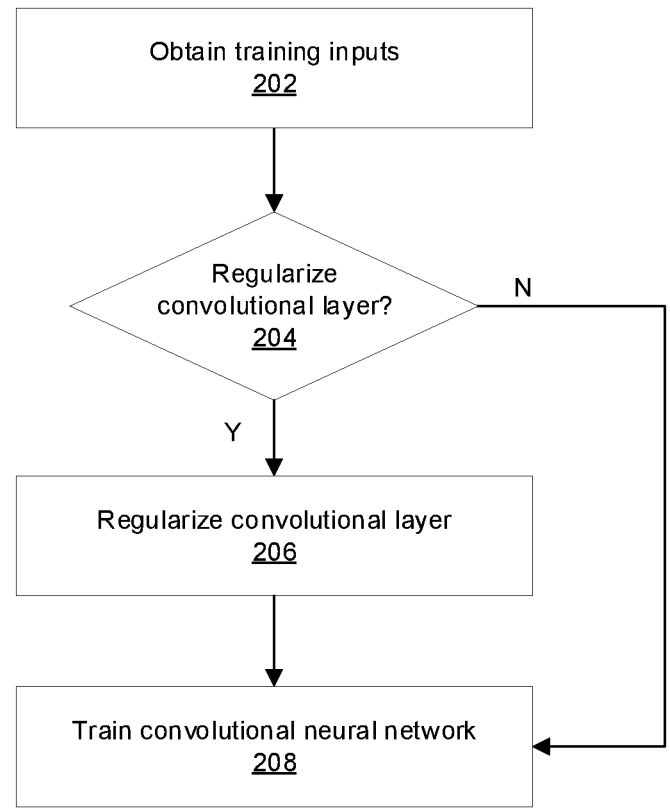
FIG. 2 is a flow diagram of an example process for training a convolutional neural network.

FIG. 2 is a flow diagram of an example process 200 for training a convolutional neural network. For convenience, the process 200 will be described as being performed by a system of one or more computers located in one or more locations. For example, a neural network system, e.g., the neural network system 100 of FIG. 1, appropriately programmed in accordance with this specification, can perform the process 200.

At the beginning of each training iteration, the system obtains a mini-batch of training inputs from the training inputs used in training a convolutional neural network (step 202). A mini-batch generally includes a fixed number of training inputs, e.g., 16, 64, or 256.

The system determines whether or not to regularize a particular convolutional layer of the one or more convolutional layers in the convolutional neural network (step 206). In particular, the system determines to regularize a particular convolutional layer when regularization criteria are satisfied. The system can make this determination in any of a variety of ways.

For example, the system can determine whether a specified number (e.g., 50, 100, or 200) of training iterations have been performed since a preceding time that the convolutional layers in the convolutional neural network was regularized. If a specified number of training iterations have been performed since a preceding time that the convolutional layers in the convolutional neural network were regularized, the system determines that all convolutional layers in the convolutional neural network should be regularized. In this example, the system can apply the same criterion for all of the convolutional layers in the network or different criteria for different layers. For example, the system can regularize all of the convolutional layers every 100 iterations or regularize some convolutional layers every 50 iterations while regularizing other layers every 100 iterations.

As another example, the system can randomly select a predetermined number of convolutional layers from the one or more convolutional layers in the convolutional neural network. The predetermined number can be represented as a specific number (e.g., 1, 5, or 10), or a percentage of the total number of convolutional layers in the convolutional neural network (e.g., 5%, 10%, or 25%). The system then determines that the selected convolutional layers should be regularized.

If the system determines not to regularize the convolutional layer, the process 200 proceeds to step 208, i.e., the system trains the convolutional neural network on the mini-batch of training inputs.

If the system determines to regularize the convolutional layer, the system regularizes the particular convolutional layer (step 206). In particular, the system regularizes the current values of the coefficients that are compiled in the kernel of the particular convolutional layer. Regularizing a convolutional layer is described below with reference to FIG. 3.

The system then trains the convolutional neural network on the obtained training inputs using an iterative training process (step 208). The system processes the training inputs in the mini-batch using the convolutional neural network in accordance with the current values of the parameters, including any regularized values of the coefficients compiled in the respective kernels, to generate a training output for each input in the mini-batch. The system determines a gradient of an objective function that measures the quality of the training outputs, e.g., relative to ground truth or known outputs for the training inputs, with respect to the parameters of the convolutional neural network. At the end of each training iteration, the system applies, e.g., through back-propagation, respective updates to the current values of the parameters of the convolutional neural network using the gradients determined at the iteration.

The process 200 then returns to step 202, i.e., the system obtains a new mini-batch and trains the convolutional neural network on the new mini-batch starting from the updated current values of the parameters of the convolutional neural network.

Figure 3:
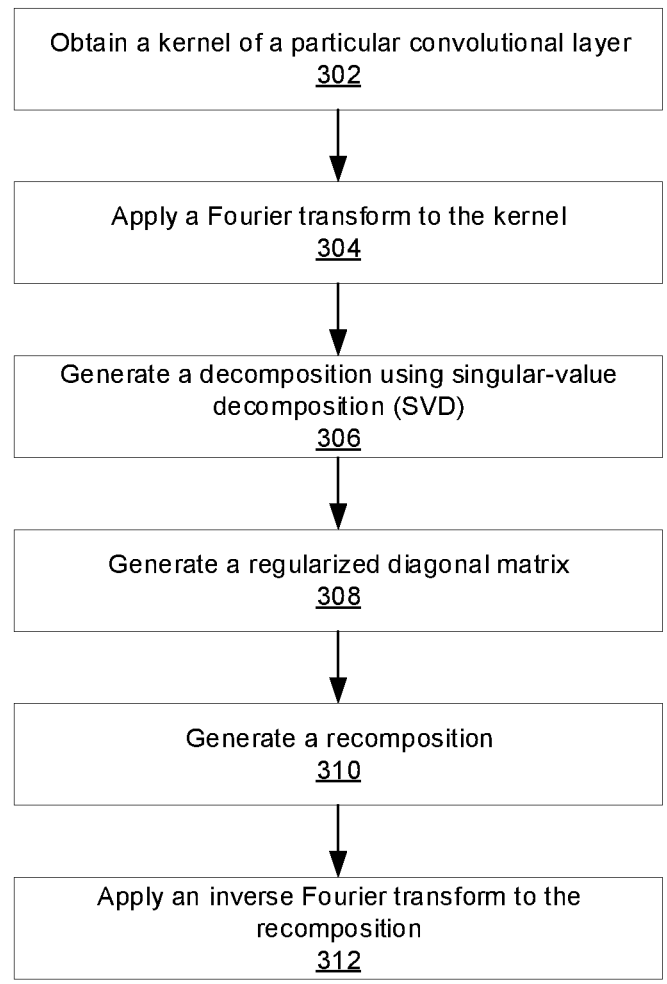
FIG. 3 is a flow diagram of an example process for augmenting the training process of a convolutional neural network by employing a regularization scheme.

FIG. 3 is a flow diagram of an example process 300 for augmenting the training process of a convolutional neural network by employing a regularization scheme. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system obtains a kernel of a particular convolutional layer from a convolutional neural network (step 302). The particular convolutional layer may be any one of the one or more convolutional layers in the network and is a layer that has been selected for regularization. As described above, the system can perform the regularization for all of the convolutional layers in the network at the same time, i.e., when the criteria are the same for all of the layers, or can perform regularization at different times during training for different convolutional layers. Specifically, the training engine 120 obtains the coefficients that are compiled in the kernel of the particular convolutional layer. The convolutional layer computes linear transformation of its inputs using these coefficients to generate respective outputs.

The system applies a Fourier transform to the obtained kernel of a particular convolutional layer to generate a frequency domain representation of the kernel (step 304). Fast Fourier transform (FFT), for example, is an algorithm that rapidly computes a discrete Fourier transform of the kernel. The algorithm converts the kernel from its original domain, i.e., space domain, to a representation in frequency domain.

Generally, a discrete Fourier transform of a kernel can be computed as a matrix multiplication of a transformation matrix and the kernel. The dimensions of the transformation matrix are determined by the dimensions of the input feature map of a convolutional layer containing the kernel.

In implementations where the input and output feature maps have more than one channels (i.e., depth dimensions greater than one), the generated frequency domain representation of the kernel in turn includes respective frequency domain representations for each pair of channels in the input and output feature maps.

The system decomposes the frequency domain representation of the kernel into two unitary matrices and a diagonal matrix using singular-value decomposition (SVD) (step 306). In matrix notation, the singular-value decomposition can be represented as $A=UDV^T$, where A is the frequency domain representation of the kernel, U and V are the unitary matrices, and D is the diagonal matrix, in which the diagonal entries can be denoted as the singular values of the frequency domain representation of the kernel.

As described above, at each iteration of the training process, the system applies respective updates to current values of parameters of the convolutional neural network, including the coefficients compiled in the kernels, using a determined gradient. The size of the determined gradient directly affects the quality of the training of the network. In some implementations where the convolutional neural network is a deep convolutional neural network, i.e., having a plurality of convolutional layers, in order to complete a training iteration, the determined gradient has to be propagated back from a last convolutional layer all the way to a first convolutional layer in the convolutional neural network. For example, if the size of the determined gradient is large, then it may become even larger during the back-propagation process, causing numerical overflow or irregular oscillations in the objective function that is used to calculate the gradient. An exploding gradient, as described in the example above, inhibits the convolutional neural network from further training.

The singular values of the kernel, as computed above, bound the factors by which the back-propagated gradient increases or decreases in size. If the singular values are all close to 1, then the gradient neither explodes nor vanishes. The singular values also bound these factors when the convolutional neural network is processing new inputs to generate respective outputs.

Therefore, in order to improve the stability of training process, the system generates a regularized diagonal matrix, in which all diagonal entries, i.e., the singular values of the kernel, are regularized (step 308). Generating a regularized diagonal matrix can be implemented by clipping all entries in the diagonal matrix that exceed a particular threshold.

Specifically, the entries in the diagonal matrix that exceed a particular threshold value, e.g., 0.1, 0.5, or 1.0, are replaced with the particular threshold value.

The system computes a product of the two unitary matrices and the regularized diagonal matrix to generate a recomposition of the frequency domain representation of the regularized kernel (step 310). In matrix notation, the equation for computing the product can be represented as $U\tilde{D}V^T = \tilde{A}$, where U and V are the unitary matrices (from the SVD of the frequency domain representation of the kernel), $\tilde{D}$ is the regularized diagonal matrix, and $\tilde{A}$ is the recomposed frequency domain representation of the regularized kernel.

The system applies an inverse Fourier transform to the recomposition to generate a recomposed kernel of the particular convolutional layer (step 312). Inverse fast Fourier transform (IFFT), for example, is an algorithm that rapidly computes an inverse discrete Fourier transform of the recomposed kernel. The algorithm converts the recomposed kernel from its frequency domain to a representation in its original domain, i.e., space domain.

Generally, an inverse discrete Fourier transform of a kernel can be computed as a matrix multiplication of an inverse transformation matrix and the kernel. The dimensions of the transformation matrix are determined by the dimensions of the input feature map of a convolutional layer containing the kernel.

In some examples, the product of the matrix multiplication, i.e., the recomposed kernel after conversion, may have the same horizontal and vertical dimensions as the input feature map, which are typically larger than the dimensions of the original kernel. The system removes all of the coefficients that are outside of the original dimensions by setting them to zero.

After the regularization, the system continues training the convolutional neural network to update the values of the regularized coefficients compiled in the recomposed kernel. The values to be updated are in place of the values of the coefficients that were previously compiled in the kernel of the particular convolutional layer.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a convolutional neural network comprising one or more convolutional layers, each convolutional layer having a respective kernel, the method comprising:
   repeatedly performing the following operations:
      obtaining a kernel of a particular convolutional layer of the one or more convolutional layers;
      applying a Fourier transform to the kernel of the particular convolutional layer to generate a frequency domain representation of the kernel;

generating, using singular-value decomposition (SVD), a decomposition of the frequency domain representation of the kernel into two unitary matrices and a diagonal matrix, wherein the diagonal matrix includes singular values of the kernel as diagonal entries;

generating a regularized diagonal matrix by regularizing the singular values of the kernel;

generating a recomposition of the frequency domain representation of the kernel using the two unitary matrices and the regularized diagonal matrix;

applying an inverse Fourier transform to the recomposition to generate a recomposed kernel; and training the convolutional neural network on training inputs to update the recomposed kernel of the particular convolutional layer.

2. The method of claim 1, wherein obtaining a kernel of a particular convolutional layer of the one or more convolutional layers comprises:

obtaining coefficients that are compiled in the kernel of the particular convolutional layer.

3. The method of claim 1, wherein the following operations further comprise:

determining that a specified number of training iterations have been performed since a preceding time that the singular values of the kernel were regularized.

4. The method of claim 1, wherein generating a regularized diagonal matrix by regularizing the singular values of the kernel comprises:

clipping any singular values that exceed a particular threshold.

5. The method of claim 1, wherein applying an inverse Fourier transform to the recomposition to generate a recomposed kernel further comprises:

removing all coefficients of the recomposed kernel that are outside of original dimensions of the kernel.

6. The method of claim 1, wherein training the convolutional neural network on training inputs to update the recomposed kernel of the particular convolutional layer comprises:

receiving a training input from a plurality of training inputs to the particular convolutional layer;

generating, using the recomposed kernel for the particular convolutional layer and the training input, an output for the particular convolutional layer;

determining a gradient of an objective function with respect to the recomposed kernel; and updating, using the gradient, the recomposed kernel.

7. The method of claim 1, further comprising:

providing data specifying the trained convolutional neural network.

8. The method of claim 1, further comprising:

using the trained convolutional neural network to process new training inputs.

9. A system comprising one or more computers and one or more storage devices storing instructions that when executed by the one or more computers cause the one or more computers to perform operations for training a convolutional neural network comprising one or more convolutional layers, each convolutional layer having a respective kernel, the operations comprising:

repeatedly performing the following operations:

obtaining a kernel of a particular convolutional layer of the one or more convolutional layers;

applying a Fourier transform to the kernel of the particular convolutional layer to generate a frequency domain representation of the kernel;

generating, using singular-value decomposition (SVD), a decomposition of the frequency domain representation of the kernel into two unitary matrices and a diagonal matrix, wherein the diagonal matrix includes singular values of the kernel as diagonal entries;

generating a regularized diagonal matrix by regularizing the singular values of the kernel;

generating a recomposition of the frequency domain representation of the kernel using the two unitary matrices and the regularized diagonal matrix;

applying an inverse Fourier transform to the recomposition to generate a recomposed kernel; and training the convolutional neural network on training inputs to update the recomposed kernel of the particular convolutional layer.

10. The system of claim 9, wherein obtaining a kernel of a particular convolutional layer of the one or more convolutional layers comprises:

obtaining coefficients that are compiled in the kernel of the particular convolutional layer.

11. The system of claim 9, wherein the following operations further comprise:

determining that a specified number of training iterations have been performed since a preceding time that the singular values of the kernel were regularized.

12. The system of claim 9, wherein generating a regularized diagonal matrix by regularizing the singular values of the kernel comprises:

clipping any singular values that exceed a particular threshold.

13. The system of claim 9, wherein applying an inverse Fourier transform to the recomposition to generate a recomposed kernel further comprises:

removing all coefficients of the recomposed kernel that are outside of original dimensions of the kernel.

14. The system of claim 9, wherein training the convolutional neural network on training inputs to update the recomposed kernel of the particular convolutional layer comprises:

receiving a training input from a plurality of training inputs to the particular convolutional layer;

generating, using the recomposed kernel for the particular convolutional layer and the training input, an output for the particular convolutional layer;

determining a gradient of an objective function with respect to the recomposed kernel; and updating, using the gradient, the recomposed kernel.

15. One or more non-transitory storage media storing instructions that when executed by one or more computers cause the one or more computers to perform operations for training a convolutional neural network comprising one or more convolutional layers, each convolutional layer having a respective kernel, the operations comprising: repeatedly performing the following operations: obtaining a kernel of a particular convolutional layer of the one or more convolutional layers; applying a Fourier transform to the kernel of the particular convolutional layer to generate a frequency domain representation of the kernel; generating, using singular-value decomposition (SVD), a decomposition of the frequency domain representation of the kernel into two unitary matrices and a diagonal matrix, wherein the diagonal matrix includes singular values of the kernel as diagonal entries; generating a regularized diagonal matrix by regularizing the singular values of the kernel; generating a recomposition of the frequency domain representation of the kernel using the two unitary matrices and the regularized diagonal matrix; applying an inverse Fourier transform to the recomposition to generate a recomposed kernel; and training the convolutional neural network on training inputs to update the recomposed kernel of the particular convolutional layer.

16. The computer-readable storage media of claim 15, wherein obtaining a kernel of a particular convolutional layer of the one or more convolutional layers comprises:
 obtaining coefficients that are compiled in the kernel of the particular convolutional layer.

17. The computer-readable storage media of claim 15, wherein the following operations further comprise:
 determining that a specified number of training iterations have been performed since a preceding time that the singular values of the kernel were regularized.

18. The computer-readable storage media of claim 15, wherein generating a regularized diagonal matrix by regularizing the singular values of the kernel comprises:
 clipping any singular values that exceed a particular threshold.

19. The computer-readable storage media of claim 15, wherein applying an inverse Fourier transform to the recomposition to generate a recomposed kernel further comprises:
 removing all coefficients of the recomposed kernel that are outside of original dimensions of the kernel.

20. The computer-readable storage media of claim 15, wherein training the convolutional neural network on training inputs to update the recomposed kernel of the particular convolutional layer comprises:
 receiving a training input from a plurality of training inputs to the particular convolutional layer;
 generating, using the recomposed kernel for the particular convolutional layer and the training input, an output for the particular convolutional layer;
 determining a gradient of an objective function with respect to the recomposed kernel; and
 updating, using the gradient, the recomposed kernel.

\* \* \* \* \*